United States Patent
Pannell

(10) Patent No.: US 8,869,691 B1
(45) Date of Patent: Oct. 28, 2014

(54) MUSHROOM COMPOST COMPACTING TAMPER

(71) Applicant: Pannell Manufacturing Corp, Avondale, PA (US)

(72) Inventor: Robert T. Pannell, Kennett Square, PA (US)

(73) Assignee: Pannell Manufacturing Corp., Avondale, PA (US)

( * ) Notice: Subject to any disclaimer, the term of this patent is extended or adjusted under 35 U.S.C. 154(b) by 0 days.

(21) Appl. No.: 14/029,025

(22) Filed: Sep. 17, 2013

(51) Int. Cl.
| | |
|---|---|
| B30B 1/00 | (2006.01) |
| B30B 9/00 | (2006.01) |
| A01G 1/04 | (2006.01) |
| B30B 3/02 | (2006.01) |
| B30B 15/10 | (2006.01) |
| B30B 1/32 | (2006.01) |
| B30B 15/18 | (2006.01) |

(52) U.S. Cl.
CPC .. *A01G 1/044* (2013.01); *B30B 9/00* (2013.01)
USPC ...... 100/226; 100/210; 100/219; 100/269.01; 100/269.13; 100/276

(58) Field of Classification Search
CPC ....... B27F 7/155; B30B 9/3075; B30B 15/04; B30B 9/3053; B30B 9/3064; B30B 9/321; B21D 37/14; B25B 27/10; A01D 85/004; B21J 13/04; A01F 15/0825; B65F 1/1405; B65G 7/12; A23N 1/003
USPC ................ 100/210, 226, 229 R, 269.01, 270, 100/269.11, 191, 192, 214, 219, 224, 227, 100/269.13, 276, 277
See application file for complete search history.

(56) References Cited

U.S. PATENT DOCUMENTS

| | | | | |
|---|---|---|---|---|
| 29,783 | A | * | 8/1860 | Harris ........................ 100/226 |
| 3,292,305 | A | | 12/1966 | Stengel |
| 3,856,276 | A | | 12/1974 | Pannell |
| 3,881,707 | A | | 5/1975 | Toto |
| 3,908,541 | A | * | 9/1975 | Meidell ...................... 100/215 |
| 3,936,975 | A | | 2/1976 | de Winter |
| 3,961,572 | A | * | 6/1976 | Johnston .................... 100/341 |
| 3,990,496 | A | | 11/1976 | Middlebrook et al. |
| 4,088,077 | A | | 5/1978 | von Beckmann |
| 4,127,062 | A | * | 11/1978 | Egosi ......................... 100/215 |
| 4,170,432 | A | | 10/1979 | Pia |
| 4,267,664 | A | | 5/1981 | Henke |
| 4,273,495 | A | | 6/1981 | Pannell |
| 4,280,800 | A | | 7/1981 | Bunn |

(Continued)

*Primary Examiner* — Shelley Self
*Assistant Examiner* — Lawrence Averick
(74) *Attorney, Agent, or Firm* — Panitch Schwarze Belisario & Nadel LLP

(57) ABSTRACT

A mushroom compost compacting system and method includes a hydraulically activated tamper platen to compact compost held within a mushroom compost receptacle. The tamper platen has engageable arms extendable from opposite ends of the top surface of the platen and that each connect to a respective hydraulic piston or cylinder. The hydraulic pistons or cylinders link to respective ends of a brace bar disposed beneath the floor portion of the compost receptacle. Tamping compression of the tamper platen compresses compost between the tamper platen and the brace bar. In one embodiment, the hydraulic pistons are installed in or joined to fixtures, which fixtures may have trolley wheels therein to permit relative movement between the fixtures and guide rails supporting the fixtures so that the mushroom compost compacting system may be traversed along the length of all or a portion of the compost receptacle.

18 Claims, 6 Drawing Sheets

(56) References Cited

U.S. PATENT DOCUMENTS

| | | | |
|---|---|---|---|
| 4,284,000 A * | 8/1981 | Almeda, Jr. | 100/229 A |
| 4,344,272 A * | 8/1982 | Gaudette et al. | 56/16.6 |
| 4,371,305 A | 2/1983 | Pannell | |
| 4,422,375 A * | 12/1983 | Morganti | 100/210 |
| 4,717,307 A | 1/1988 | Ciuffetelli | |
| 4,776,872 A | 10/1988 | Mulleavy et al. | |
| 5,463,858 A | 11/1995 | Ciuffetelli | |
| 5,511,497 A | 4/1996 | Toto | |
| 5,632,199 A * | 5/1997 | Molitorisz et al. | 100/100 |
| 6,186,083 B1 | 2/2001 | Toto | |
| 6,817,286 B2 | 11/2004 | Toto | |
| 7,044,233 B2 | 5/2006 | Toto | |
| 7,059,242 B2 * | 6/2006 | Lemke et al. | 100/226 |
| 2004/0065215 A1 | 4/2004 | Toto | |
| 2011/0203464 A1 * | 8/2011 | Johannesen, Jr. | 100/56 |

* cited by examiner

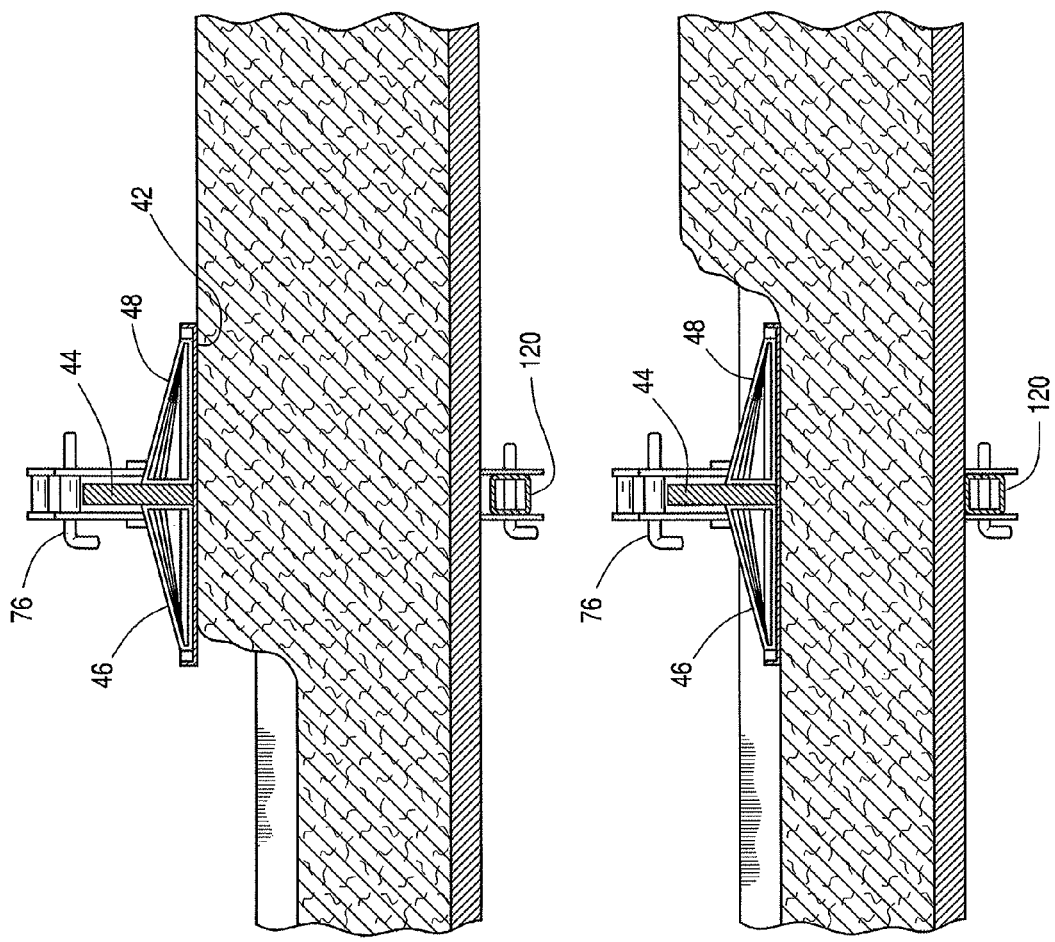

MUSHROOM COMPOST COMPACTING TAMPER

BACKGROUND OF THE INVENTION

1. Field of the Invention

The field of the invention is mushroom compost compacting systems, and particularly those systems for composting Phase II or Phase III mushroom composts.

2. Background

Mushroom farming comprises generally six steps: (1) Phase I composting; (2) Phase II composting; (3) spawning; or (2a/3a) Phase III composting; (4) casing; (5) pinning; and (6) cropping. The most used and least expensive mushroom compost is straw-bedded horse manure to which nitrogen supplements and a conditioning agent, such as gypsum, are added. After the compost ingredients have been mixed, watered and aerated in Phase I for a requisite number of days, the compost is pasteurized in Phase II. Pasteurization kills insects, unwanted fungi or other pests that may be present in the compost.

Preparing Phase II mushroom compost can be difficult. One reason for the apparent difficulty with this phase is that pasteurization can last up to two weeks, depending upon the production system used. The time required, as well as other difficulties in maintaining temperature control and eliminating pests during this phase have led many mushroom farmers to purchase pre-pasteurized compost. In many cases, the Phase II compost is pre-mixed with mushroom spawn. Alternatively, Phase III compost is pasteurized, pre-mixed with mushroom spawn and spawn run.

When commercial mushroom farmers purchase pre-pasteurized Phase II or Phase III composts, proper compaction of mushroom beds is still necessary to spawn and grow mushrooms. Moreover, regardless the type of receptacle in which the compost is stored during processing, uniform compaction and density of the compost is beneficial for mushroom cultivation. For maximum yield, mushroom beds should have Phase II and Phase III compost density and compaction that fosters gas exchange, keeps compost temperatures sufficiently low, and prevents spawn kill in the next phase of processing.

Some commercial mushroom farmers who purchase pre-pasteurized compost introduce the Phase II or Phase III compost into beds by conveyor and attempt to use spawning machines to compact the compost. These machines, however, are not designed to compact to the degree desired for mushroom cultivation. Furthermore, these machines are less than desirable for commercial mushroom farmers because during operation they also chop up the spawn incorporated into the compost, potentially interfering with the next step in mushroom farming.

Other known compacting systems and methods are impractical for commercial use. One such system shown in U.S. Pat. No. 4,422,375 uses an assembly with rollers and smoothing plates. In this system, mushroom compost is partially compacted after placement into the mushroom bed. The assembly is then horizontally positioned over the bed and manually guided by two operators located on each side of the bed. This system tends to compact only a surface layer portion of the bed. Compaction to some degree has also been performed by hand after placement of compost in the bed. These time-consuming manual systems and methods make clear the need for improved mushroom compaction systems.

One significant improvement to mushroom compost compacting systems and methods is disclosed in U.S. Pat. Nos. 8,205,379 and 8,069,608. In such system, a roller assembly mounted to the mushroom compost receptacle works in combination with a compost conveyor. Mushroom compost is conveyed to the nip between the roller assembly and the floor portion of the mushroom compost receptacle. FIG. 1 shows one embodiment of the improved mushroom compacting system. The improved mushroom compacting system effectively compacts a major portion of the mushroom compost held in the compost receptacle. But a portion of the mushroom compost receptacle into which mushroom compost is introduced is not conveyed through the nip between the roller assembly and the floor portion of the mushroom compost receptacle. This is due to the practical positioning of the roller at a distance spaced apart from the front end of the mushroom compost receptacle at which mushroom compost is loaded onto the conveyor. Mushroom compost in such front end portion of the mushroom compost receptacle still can be used for growing mushrooms if it can be compacted to a satisfactory degree. An apparatus, system and method for compacting effectively this front end portion of mushroom compost continues to be sought.

While certain aspects of prior art mushroom compacting systems have been discussed, aspects of these systems are in no way disclaimed and it is contemplated that the claimed invention may encompass one or more aspects of the prior art devices discussed herein.

SUMMARY OF THE INVENTION

The present invention is directed toward a mushroom compost compacting system and method. In one embodiment, the mushroom compost compacting system has a tamper platen with a top surface and a tamping surface opposite the top surface. The tamper platen is installed over mushroom compost in a compost receptacle. A first engageable arm and a second engageable arm are engaged to the top surface of the tamper platen. The first engageable arm may be formed from two spaced apart sides leaving a gap therebetween. The spaced apart sides may be joined together. Similarly, the second engageable arm may be formed from two spaced apart sides leaving a gap therebetween. Optionally, the first engageable arm and second engageable arm are slidably engaged to slots formed in the tamper platen or formed in an upright or guide associated with the top surface of the tamper platen.

A brace bar is positioned under a bottom floor of a compost receptacle. A first hydraulic piston is removably coupled directly or indirectly at one end to the first engageable arm and at its opposite end to the first end of the brace bar. A second hydraulic piston is removably coupled directly or indirectly at one end to the second engageable arm and at its opposite end to the second end of the brace bar. Upon activating the first and second hydraulic pistons, the tamper platen is urged toward the brace bar to compress mushroom compost held in the compost receptacle between the tamper platen and the brace bar.

The first engageable arm preferably traverses from a first position seated over the top surface of the tamper platen to a second position with its one end extending outwardly from the top surface of the tamper platen, for connection to the first hydraulic piston. The second engageable arm preferably traverses from a first position seated over the top surface of the tamper platen to a second position with its one end extending outwardly from the top surface of the tamper platen and in an opposite direction from the first engageable arm, for connection to the second hydraulic piston.

The first hydraulic piston may be installed in or joined to a first trolley fixture. The second hydraulic piston may be installed in or joined to a second trolley fixture. The first trolley fixture and second trolley fixture may be installed for relative movement over a rail or sidewall of the mushroom compost receptacle. Optionally, the first trolley fixture is installed for relative movement to a first guide rail that is removably appended to a sidewall of the compost receptacle. Optionally, the second trolley fixture is installed for relative movement to a second guide rail that is removably appended to an opposite sidewall of the compost receptacle.

Preferably, the tamper platen includes a guide affixed to or integrally formed with the top surface of the tamper platen. The guide defines a first slot, wherein the first engageable arm is operatively coupled to said first slot for relative movement of the first engageable arm with respect to the top surface of the tamper platen. The guide also defines a second slot, wherein the second engageable arm is operatively coupled to said second slot for relative movement of the second engageable arm with respect to the top surface of the tamper platen. Most preferably, the first engageable arm has a first handle affixed to or formed at one end thereof, and the second engageable arm has a second handle affixed to or formed at one end thereof.

Preferably, a first mating pin extends from the guide and at least one latch or hook disposed on the first engageable arm is adapted to engage said first mating pin. In addition, a second mating pin extends from the guide and at least one other latch or hook disposed on the second engageable arm is adapted to engage the second mating pin. The latches or hooks and mating pins more fixedly hold the first engageable arm and second engageable arm in their extended positions for coupling to the hydraulic pistons.

In another embodiment, a method for compacting mushroom compost includes using the mushroom compost compacting system as described herein. In such method a tamper platen is placed onto a quantity of mushroom compost to be compacted in a compost receptacle, and a brace bar is placed under a bottom floor of the compost receptacle. A first hydraulic piston is coupled to a first end of the brace bar, and a second hydraulic piston is coupled to a second end of the brace bar. The first hydraulic piston is coupled directly or indirectly at one end to the first engageable arm, and is coupled or joined at its opposite end to the first end of the brace bar. A second hydraulic piston is coupled directly or indirectly at one end to the second engageable arm, and is coupled or joined at its opposite end to the second end of the brace bar. Upon activating the first hydraulic piston and the second hydraulic piston, the tamper platen moves toward the brace bar so that mushroom compost disposed beneath the tamper platen is compacted.

Preferably, the first hydraulic piston is mounted in or affixed to or joined to a first trolley fixture, and the second hydraulic piston is mounted in or affixed to or joined to a second trolley fixture. The first trolley fixture is removably coupled to a first guide rail for relative movement of said first trolley fixture along said first guide rail, and the second trolley fixture is removably coupled to a second guide rail for relative movement of said second trolley fixture along said second guide rail. The first trolley fixture thus may be moved along at least a portion of the length of the first guide rail, and the second trolley fixture may be moved along at least a portion of the length of the second guide rail. This movement of the first trolley fixture and the second trolley fixture also moves the tamper platen and the brace bar and the hydraulic pistons.

To adjust positioning of the tamper platen to another section of a mushroom compost receptacle, and to move beyond one or more upright posts that link the various mushroom compost receptacles disposed in stacked relation, the tamper platen may be decoupled from the first hydraulic piston and the second hydraulic piston. The first hydraulic piston may be decoupled from the first engageable arm, the second hydraulic piston may be decoupled from the second engageable arm. The engageable arms may then be slid to a position over the tamper platen. By repositioning the engageable arms over the tamper platen, the tamper platen may more easily be urged to a new position beyond one or more upright posts. Or the tamper platen may be removed from the mushroom compost receptacle and installed in a new position on compost in a different mushroom compost receptacle. Once in a new position, the tamper platen may be recoupled to the hydraulic pistons that are engaged to the brace bar. The mushroom compost compacting system then may be activated again to compress mushroom compost at the new location.

As one example, the mushroom compost compacting system may compress or compact a quantity of mushroom compost from a height of about 15 to 16 inches to a height of about 6 to 9 inches following compaction.

Advantages of the system and method will appear from the drawings and following description.

BRIEF DESCRIPTION OF THE DRAWINGS

The invention described above will be explained in greater detail below on the basis of embodiments and with reference to the accompanying drawings in which:

FIG. 7 is a cross-sectional view taken along line 7-7 in FIG. 3 showing the mushroom compost compacting system prior to compaction; and FIG. 8 is a cross-sectional view showing the mushroom compost compacting system of FIG. 3 as it compacts mushroom compost.

DETAILED DESCRIPTION OF THE PREFERRED EMBODIMENTS

Figure 1:
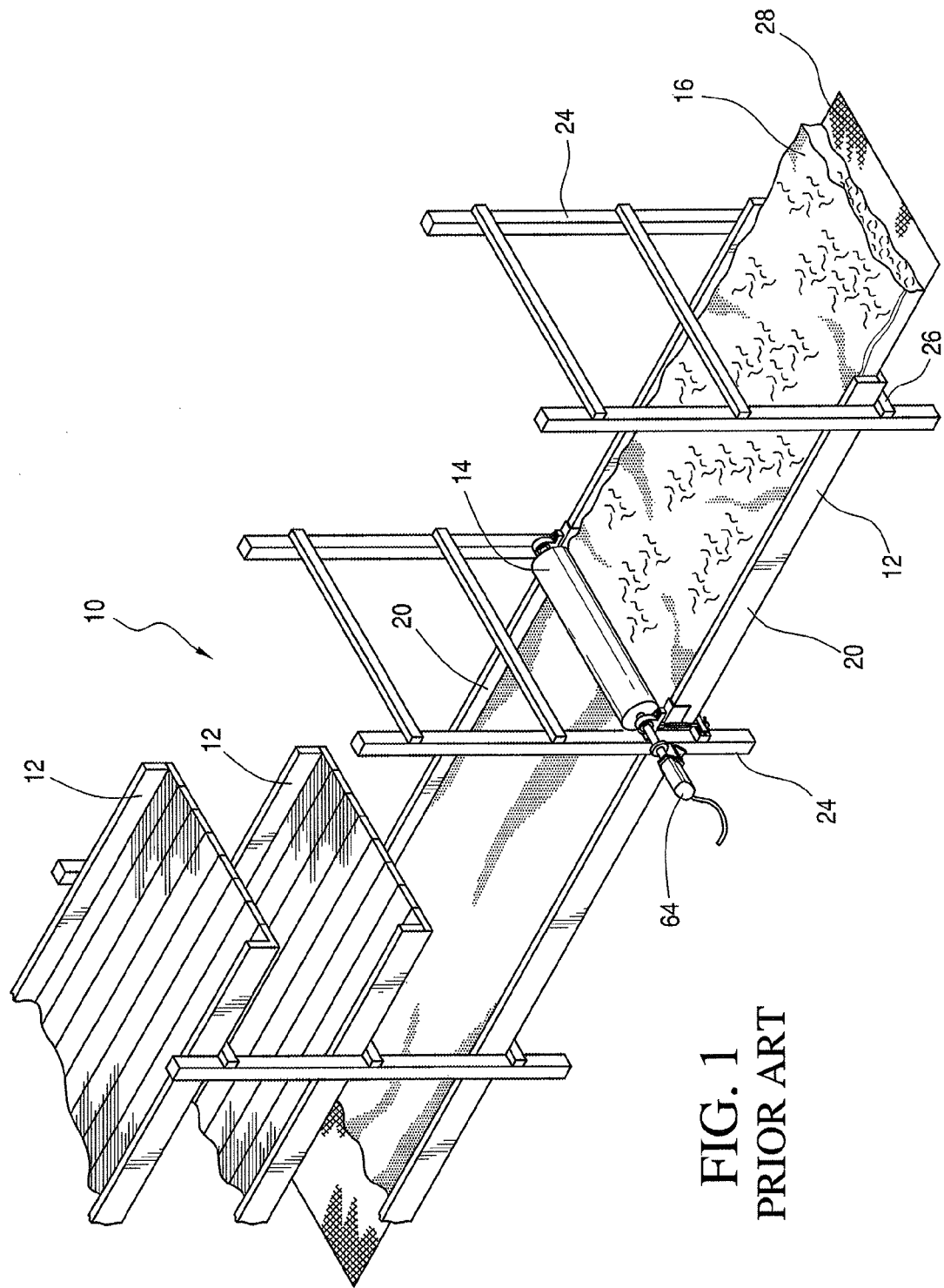
FIG. 1 is a top perspective view of a mushroom compost bed with a prior art mushroom compost compacting system.

Turning in detail to the drawings, FIG. 1. illustrates a mushroom compost bed 10 that includes a series of trays or shelves, herein compost receptacles 12, into each of which mushroom compost 16 is deposited or laid. The mushroom compost 16 may be Phase I, Phase II or Phase III compost. Phase II compost may be pre-spawned, and Phase III compost may be spawn run. The compost receptacle 12 may be any geometric configuration suitable to house mushroom compost 16. In one configuration as shown in FIG. 1, the compost receptacle 12 is an elongated bin, tray, or shelf that has two endwalls 18 (not shown), two sidewalls 20, and a bottom 22. The bottom may be a series of slats or decking running generally lengthwise. Each compost receptacle 12 is supported by vertical posts or members 24 positioned at each corner of the compost receptacle 12 and optionally at intervals along the length of the compost receptacle 12. The vertical posts or members 24 may act as supporting legs for one or more compost receptacles 12. As shown in FIG. 1, the vertical posts or members 24 extend vertically to support other compost receptacles (three tiers shown in FIG. 1). Compost beds may include six or seven compost receptacles 12 mounted in stacked relation. These types of multi-tiered compost receptacles are typical in commercial mushroom farming. For additional support, some compost receptacles also have horizontal members or joists 26 that may be mounted to or connected to the vertical members 24 and extend under the floor portion of the compost receptacle 12. Typically, the compost receptacles 12 are wooden, although any suitable material may be used, including, but not limited to plastic, metal, and composite materials.

The mushroom compost 16 is initially placed into the compost receptacle 12 from any suitable source. Preferably, the mushroom compost 16 is distributed inside the compost receptacle 12 along the length of the compost receptacle using a conveyor system (not shown) that acts on the web or conveyor or liner 28. In one type of conveyor system, at one end of the compost receptacle 12, compost is placed on top of the flexible web or conveyor or liner 28 in the bottom 22 of the compost receptacle 12 at a front end or proximal end thereof. The liner 28 is then pulled from the opposite distal end of the compost receptacle 12, such that the compost 16 is distributed or spread along the length of the compost receptacle 12. Examples of suitable materials for the liner include woven fabrics with a plastic or Teflon coating, or may be polyester.

A prior art mushroom compost compacting system as shown in FIG. 1 includes a roller assembly 14 that is removably affixed to the compost receptacle 12. A fuller description of the prior art mushroom compost compacting system is set forth in U.S. Pat. Nos. 8,205,379 and 8,069,608, the contents of which are hereby incorporated by reference. Once installed, the prior art mushroom compacting system compacts mushroom compost from a first height A to a compacted height B. Upon completing compaction of compost to a desired thickness within a first bin or tray of a mushroom compost bed 10, the mushroom compacting system may be detached from the sidewalls 20 of the compost receptacle 12 and attached to another bin or tray.

Owing that space must be left at the front end or proximal end of the compost receptacle 12 to permit workers to introduce mushroom compost onto the web or conveyor or liner 28, the roller assembly 14 is mounted at a distance that is spaced apart from the front end or proximal end of the compost receptacle 12. Some of the mushroom compost loaded onto the web or conveyor or liner 28 is not conveyed into the nip of the roller assembly 14 to be compacted. This portion of mushroom compost may be compacted by other means.

Figure 2:
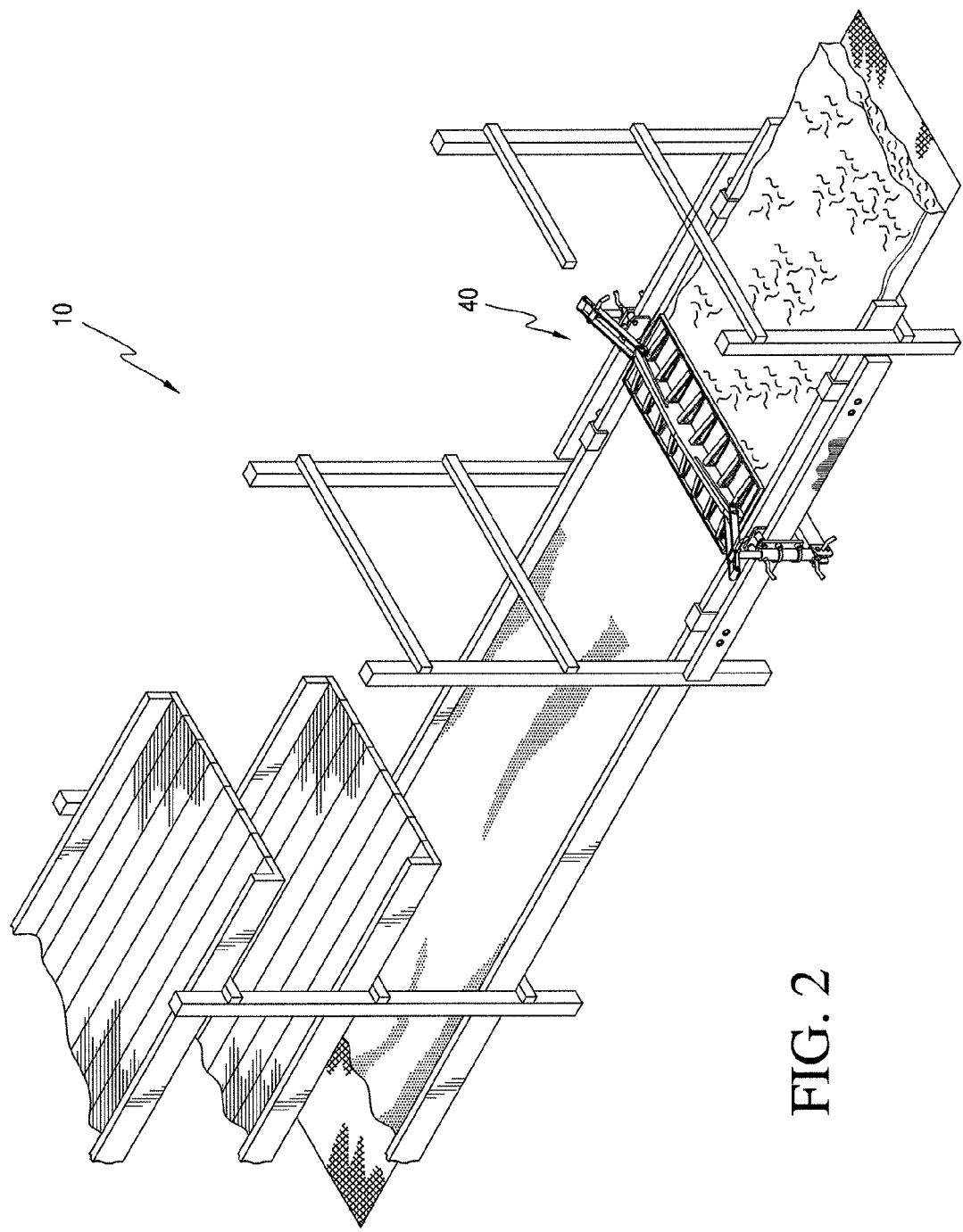
FIG. 2 is a top perspective view of a mushroom compost bed with a mushroom composting compacting system according to the invention.
Figure 3:
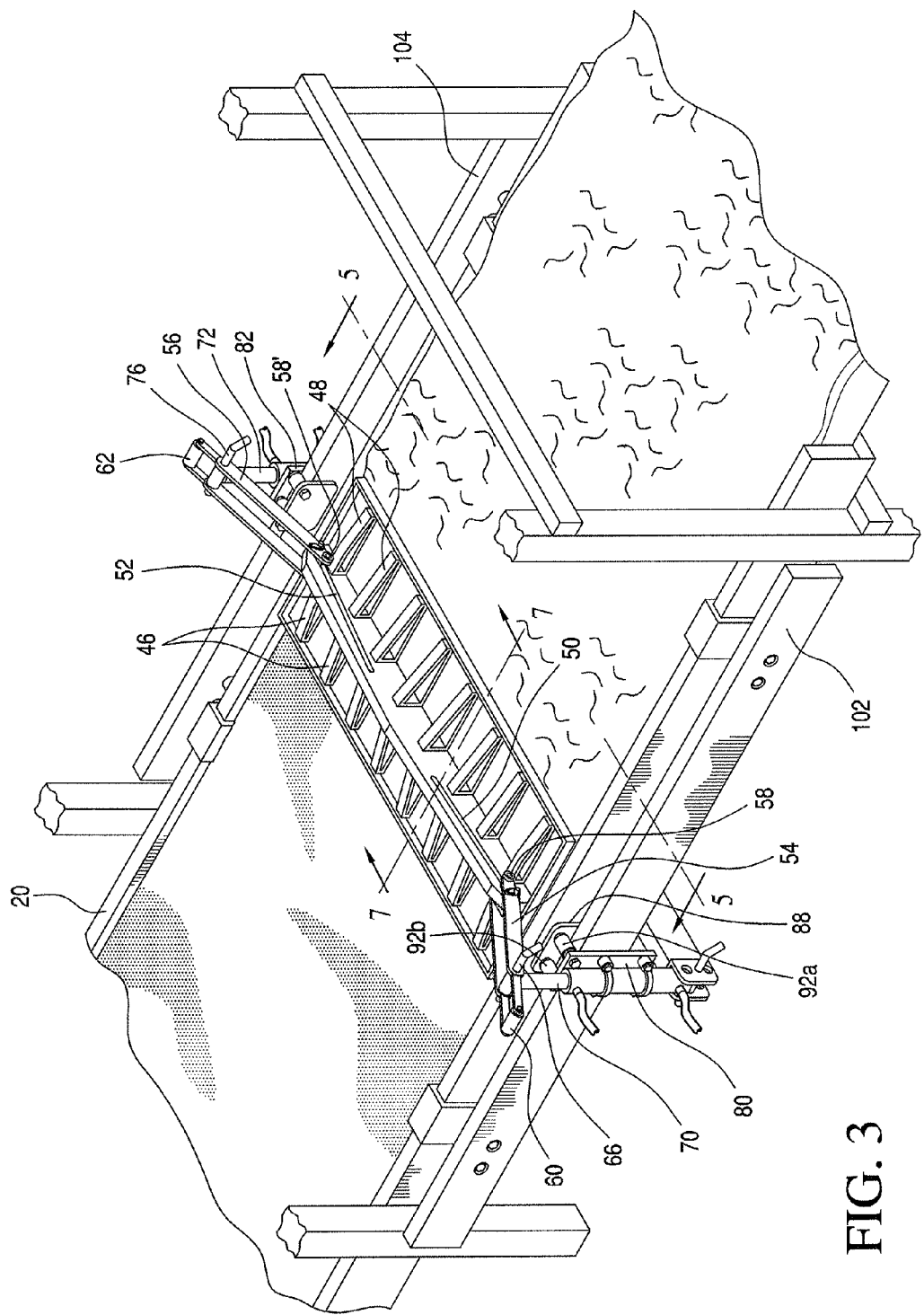
FIG. 3 is a top perspective view of the mushroom compost compacting system of FIG. 2.
Figure 4:
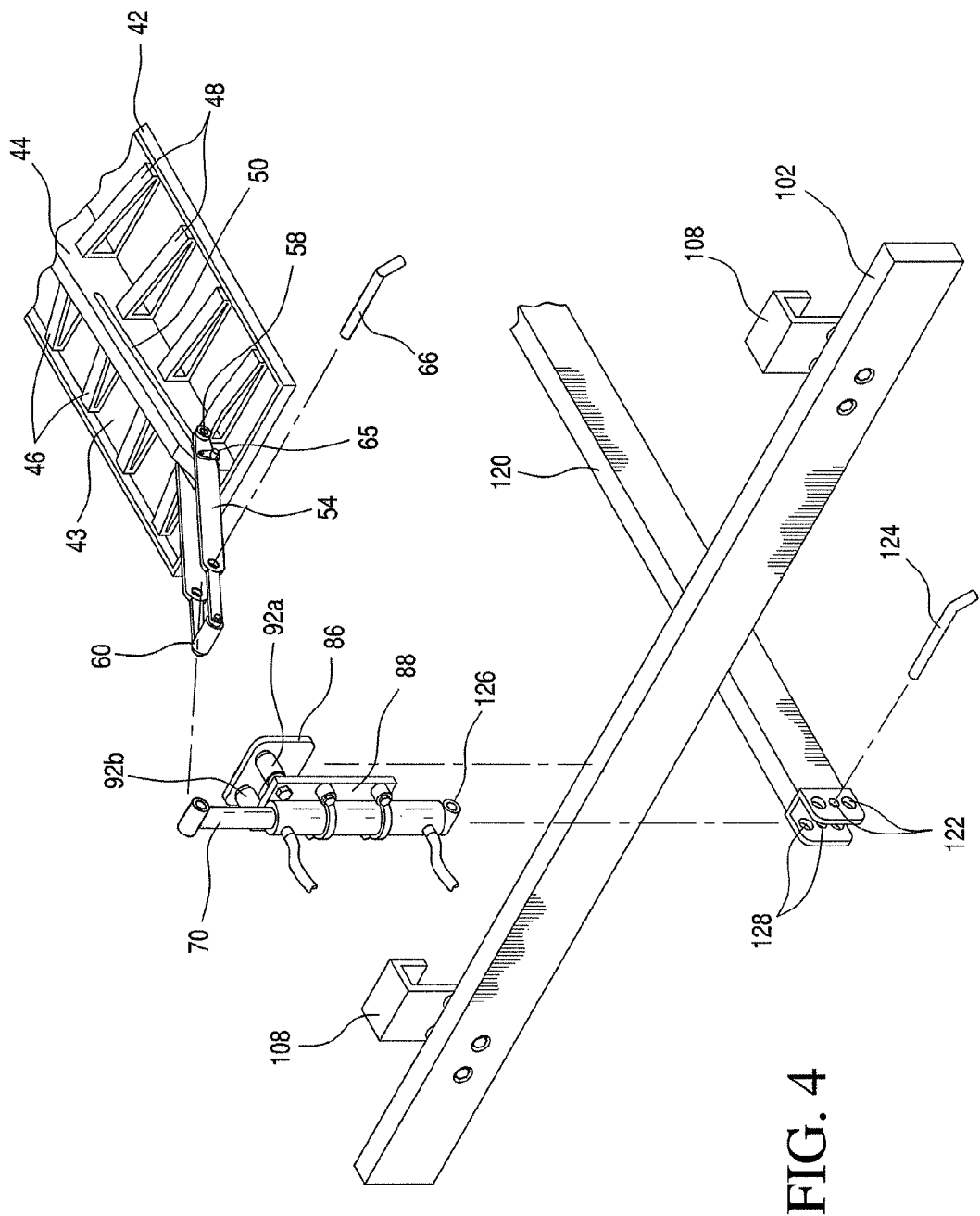
FIG. 4 is an exploded view of the tamper platen, first piston, brace bar and guide rail of the mushroom compost compacting system of FIG. 2.

Referring now to FIGS. 2-4, a mushroom compost compacting system 40 according to the present invention includes a tamper platen 42 with a top surface 43 and a tamping surface opposite the top surface. An upright or center upstanding wall 44 extends upwardly from the top surface 43 of the tamper platen 42. In the embodiment shown, the upright 44 is supported by a plurality of braces 46, 48.

Preferably, the tamper platen 42 and braces 46, 48 are formed of a material that does not easily corrode or rust when exposed to moisture, and that has sufficient strength to withstand compressive forces exerted thereon. One suitable material is a metal, such as aluminum, steel or stainless steel, optionally with corrosion resistant coatings.

The guide or upright 44 defines a first slot 50 and a second slot 52. The first slot 50 and second slot 52 are disposed at an angle from horizontal, such as from 5° to 20°, preferably about 8° to 15°. The proximal end of each of the first slot 50 and second slot 52 is spaced apart a greater distance from the top surface of the tamper platen 42 than is the distal end of each of the first slot 50 and second slot 52.

In the embodiment shown in FIGS. 2-4, a first engageable arm 54 is joined to the first slot 50 for slidable movement of the arm with respect to the guide or upright 44. A second engageable arm 56 is joined to the second slot 52 for slidable movement of the arm with respect to the upright 44. Preferably, the first engagable arm 54 comprises a first side and a second side that are spaced apart from one another leaving a central gap therebetween. A pin or dowel 58 inserted through holes at the ends of the first side and the second side join the first side and the second side together. Such pin or dowel 58 in turn is seated within the first slot 50 of the guide or upright 44 and slidably traverses the length of the first slot 50 from the slot proximal end to the slot distal end. Preferably, the second engageable arm 56 comprises a first side and a second side that are spaced apart from one another leaving a central gap therebetween. A pin or dowel 58' inserted through holes at the ends of the first side and the second side join the first side and the second side together. Such pin or dowel 58' in turn is seated within the second slot 52 of the upright 44 and slidably traverses the length of the second slot 52 from the slot proximal end to the slot distal end. In FIG. 3, the pin or dowel 58 is shown in the slot 50 distal end, and the pin or dowel 58' is shown in the slot 52 distal end.

In FIG. 3, the arms 54, 56 are disposed at an upwardly directed angle with respect to the top surface of the tamper platen 42. The angle may be adjusted by the operator or user as desired. With the arm positions shown in FIG. 3, the opposite ends of the arms 54, 56 extend above the top surface of the tamper platen 42 and outside of the compost receptacle 12.

A first handle 60 is appended to or formed at the opposite end of the first engageable arm 54. A second handle 62 is appended to or formed at the opposite end of the second engageable arm 56.

At or near the opposite end of the first engageable arm 54 holes are formed in the first side and second side to receive pin 66. Pin 66 is threaded through the holes of the first engageable arm 54 and through a receiving channel or opening 68 formed in an upper end of a first hydraulic cylinder or piston 70 to join the arm 54 to the upper end of the hydraulic piston 70. At or near the opposite end of the second engageable arm 56 holes are formed in the first side and second side to receive pin 76. Pin 76 is threaded through the holes of the second engageable arm 56 and through a receiving channel or opening 78 formed in an upper end of a second hydraulic cylinder or piston 72.

A pin 65 extends from a side surface of the upright 44 for engagement with a hook 64 disposed near the end of the first engageable arm 54 that is joined by pin 58 to the first slot 50. When the first engageable arm 54 is moved from a position seated over the top surface of the tamper platen 42 to an extended position for engagement with the first hydraulic piston 70, the hook 64 engages pin 65 to supportively hold the arm 54 in its extended position. Preferably, pins 65 extend from opposite sides of the upright 44 and each side of the first engageable arm 54 includes a hook 64 to engage a respective pin 65. Such preferred embodiment is shown in FIGS. 2-4. Similarly, the second engageable arm 56 includes hook(s) 64 that engage pin(s) 65 extending from side surface(s) of the upright 44 at the opposite side of the tamper platen 42 to supportively hold the arm 56 in its extended position.

While arms 54, 56 have been shown with pins 58, 58' slidably engageable within slots formed in the guide or upright 44, in an alternative construction, arms 54, 56 could be separable from the top surface of the platen so that they could be moved to alternative positions in respect of the top surface of the platen 42.

In the embodiment of the invention shown in FIGS. 2-4, each hydraulic cylinder or piston 70, 72 is mounted in or joined to a trolley fixture 80, 82. First trolley fixture 80 comprises a first plate 86 spaced apart from a second plate 88. First and second shafts 90*a*, 90*b* are threaded through holes formed in the first plate 86 and the second plate 88. The shafts 90*a*, 90*b* support wheels 92*a*, 92*b* for rotation on such shafts 90*a*, 90*b*. Similarly, second trolley fixture 82 comprises a first plate spaced apart from a second plate. First and second shafts are threaded through holes formed in the first plate and the second plate and support wheels for rotation on such shafts.

In the embodiment of the invention shown in FIGS. 2-4, the trolley fixtures 80, 82 engage first and second guide rails 102, 104 that are removably appended to sidewalls of the compost receptacle. The first trolley fixture 80 is coupled for relative movement on the first guide rail 102 wherein the wheels 92*a*, 92*b* contact a top surface of the first guide rail 102. The second trolley fixture 82 is coupled for relative movement on the second guide rail 104 wherein the wheels of the second trolley fixture contact a top surface of the second guide rail 104. U-shaped channels 108 are joined to the first guide rail 102 to facilitate mounting the first guide rail 102 to the sidewall 20 of the compost receptacle 12. U-shaped channels 108 are joined to the second guide rail 104 to facilitate mounting the second guide rail 104 to the sidewall 20 of the compost receptacle 12. The mounting pins or bolts used to join the U-shaped channels 108 to the first guide rail 102 and to the second guide rail 104 have a length that leaves a gap between the sidewalls of the U-shaped channels 108 and the respective first guide rail 102 or second guide rail 104. The gap between the sidewalls of the U-shaped channels 108 and the first guide rail 102 is sufficient to permit a portion of the first trolley fixture 80, such as the second plate 88, to travel therein. Similarly, the gap between the sidewalls of the U-shaped channels 108 and the respective second guide rail 104 is sufficient to permit a portion of the second trolley fixture 82, such as the second plate thereof, to travel therein. The first and second guide rails 102, 104 are adapted to fit over the sidewall 20 of a compost receptacle 12, and have a length that is comparable to the distance between vertical posts 24 for the compost receptacle 12. The first and second guide rails 102, 104 may rapidly be inserted over sidewalls 20 of the compost receptacle 12, and rapidly removed and re-installed over alternative locations of the sidewalls 20 of the compost receptacle 12. The first and second guide rails 102, 104, when used, preferably are used in pairs positioned on sidewalls 20 opposite from one another on a compost receptacle 12. See FIGS. 2, 3, 5 and 6.

Alternatively, the optional first and second guide rails 102, 104 are not used. Instead, the first trolley fixture 80 and second trolley fixture 82 may be installed directly onto the sidewalls 20 or other rails (e.g., pick rails) of the compost receptacle 12 for movement with respect thereto. In such alternative embodiment, the wheels 92*a*, 92*b* then contact the top surfaces of the sidewalls 20 or other rails (e.g., pick rails) of the compost receptacle 12.

A brace bar 120 is joined at one end to the bottom of the first hydraulic piston 70 and at its opposite end to the bottom of the second hydraulic piston 72. The brace bar 120 is positioned beneath the bottom 22 or floor of the compost receptacle 12. As shown in FIGS. 2-4, the brace bar 120 comprises a square channel, although other shape configurations are within the scope of the invention. The brace bar 120 has a length that is longer than the width of the bottom 22 of the compost receptacle 12. See FIGS. 5 and 6. The brace bar 120 may be formed of steel or other metal or other material capable of withstanding compression along its length.

One end of the brace bar 120 comprises a first flange that defines one or a series of holes 122 through which a pin 124 may be inserted, and a second flange that defines one or a series of holes 128 also to receive the pin 124. As seen in the exploded view of FIG. 4, the pin 124 is fitted into hole 122 of the first flange and through a fitting defining a pin-receiving channel 126 at the bottom of the first hydraulic piston 70 and through hole 128 in the second flange. The second hydraulic piston 72 is similarly connected to the opposite end of the brace bar 120.

The first and second hydraulic cylinders or pistons 70, 72 may be the same model or different model piston. Preferably, the first and second hydraulic pistons comprise 1500 to 2000 lb. cylinders. The first and second hydraulic cylinders or pistons 70, 72 are operatively connected to a pump or generator (not shown) for concurrently or sequentially actuating the hydraulic cylinders or pistons to urge the tamper platen 42 and brace bar 120 closer to or farther from one another. When the hydraulic cylinders or pistons 70, 72 are actuated to draw the tamper platen 42 and brace bar 120 toward one another, compost material held between the bottom surface of the tamper platen 42 and the bottom 22 of the compost receptacle 12 is tamped or compressed from a first uncompressed height to a second compressed height that is less than the first uncompressed height.

Mushrooms grow best in a uniformly compacted mushroom compost material growing medium. One objective of the mushroom compost compacting system of this invention is to compress those portions of the mushroom compost held within the receptacle 12 at locations that are not compressed by the roller assembly 14 of the prior art. The tamper platen 42 in combination with the brace bar 120 and the hydraulic cylinders or pistons 70, 72 distributes the compressive force evenly through the thickness of the compost material. Hence, the compost material has a uniform degree of compression at its upper portion in contact with the bottom surface of the tamper platen 42 and at its lower portion in contact with the bottom 22 of the compost receptacle. The compaction is not restricted to only a top few inches of the compost material. Rather, the degree of compression or compaction is more uniform throughout the compressed height of the mushroom compost.

Figure 5:
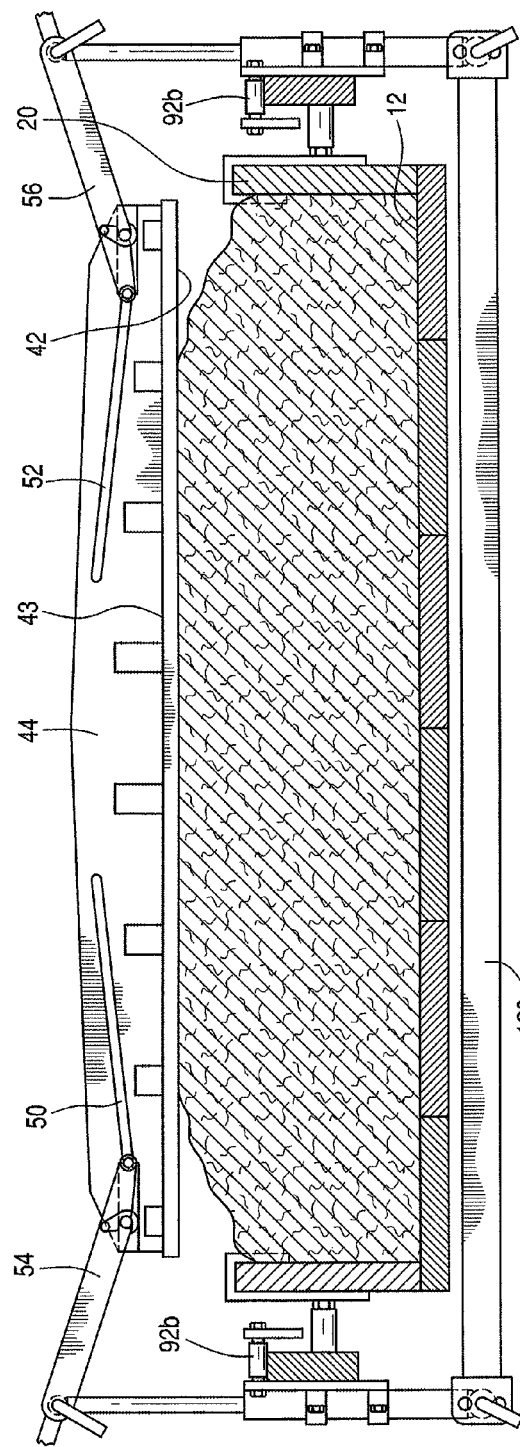
FIG. 5 is a cross-sectional view taken along line 5-5 in FIG. 3 showing the mushroom compost compacting system prior to compaction.

Referring now to FIGS. 5-8, FIGS. 5 and 7 show the mushroom compost compacting system 40 with the tamper platen 42 joined to the upper portions of the first and second hydraulic pistons 70, 72 by the first and second arms 54, 56, and with the brace bar 120 joined to the lower portions of the first and second hydraulic pistons 70, 72 by pin connections. The first and second trolley fixtures 80, 82 are disposed in rolling contact with the first guide rail 102 and second guide rail 104, respectively. The mushroom compost compacting system as shown in FIGS. 5 and 7 is assembled and ready for tamping or compacting mushroom compost, but the first and second hydraulic pistons 70, 72 have not yet been activated to cause tamping or compressing action.

Figure 6:
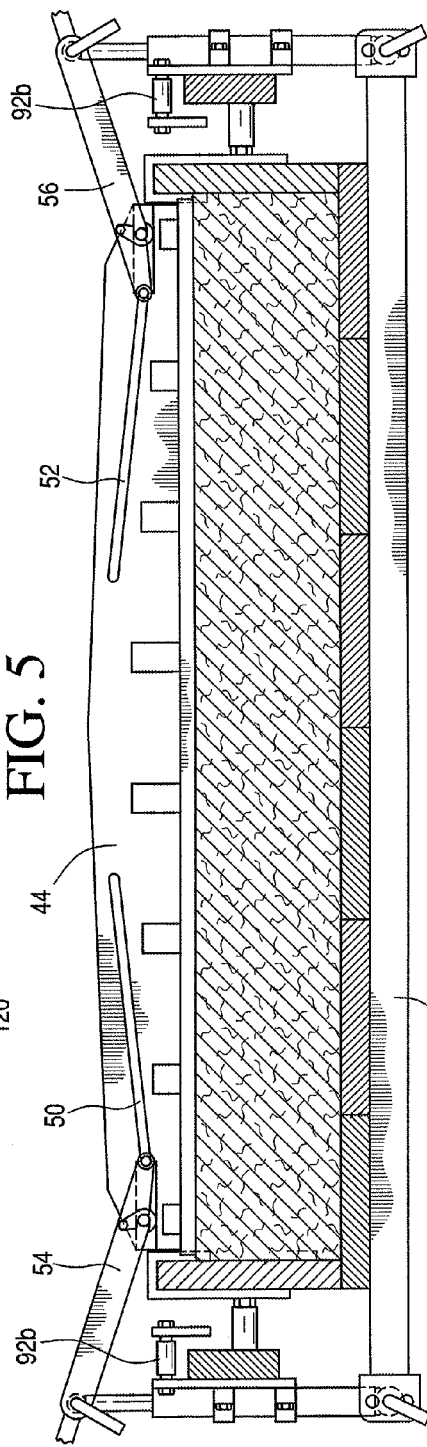
FIG. 6 is a cross-sectional view showing the mushroom compost compacting system of FIG. 3 as it compacts mushroom compost.

FIGS. 6 and 8 show the mushroom compost compacting system 40 after the first and second hydraulic pistons 70, 72 are activated. The pistons 70, 72 urge the tamper platen 42 in a downward direction while concurrently urging the brace bar 120 in an upward direction, and the brace bar 120 now contacts the floor portion or bottom 22 of the compost receptacle.

To operate the mushroom compost compacting system 40 according to the invention, a team of two operators or users works together, one stationed at each end of the tamper platen

42. The first user holds the handle 60, and the second user holds the handle 62. When the hydraulic cylinders or pistons 70, 72 are activated, the tamper platen 42 compresses the mushroom compost material beneath its bottom surface. The handles 60, 62 are drawn downwardly with the first engageable arm 54 and the second engageable arm 56 by the action of the hydraulic cylinders or pistons 70, 72. When the hydraulic cylinders or pistons 70, 72 are de-activated, to release the compressing force, the handles 60, 62 may be lifted. The first and second users then may urge the tamper platen 42, first and second hydraulic cylinders or pistons 70, 72 and brace bar 120 to a next location of the compost receptacle 12 by grasping the handles 60, 62 and causing the first trolley fixture 80 and second trolley fixture 82 to travel along the first and second guide rails 102, 104, respectively. If trolley fixtures 80, 82 are not used, the first and second users move the tamper platen 42, first and second hydraulic cylinders or pistons 70, 72 and brace bar to the next location of the compost receptacle 12 by lifting the handles 60, 62. Once at the new location, the hydraulic cylinders or pistons 70, 72 may be again activated to cause the tamper platen 42 to compress the mushroom compost material beneath its bottom surface at the new location.

Because a series of mushroom compost receptacles 12 are generally constructed in stacked relation, with several receptacles stacked one above the other with space therebetween, vertical posts 24 to support the receptacles are disposed at intervals along the length of a mushroom compost receptacle 12. One advantage of the mushroom compost compacting system 40 of the invention is that the engageable arms 54, 56 may be quickly disconnected from the hydraulic cylinders or pistons 70, 72 or the first and second trolley fixtures 80, 82. The users may disconnect the engageable arms 54, 56 by removing the pins 66, 76. Then, the engageable arms 54, 56 may be adjusted to positions disposed directly over the top surface of the tamper platen 42 by sliding the pins 58 within the first slot 50 and second slot 52 to the proximal ends of the slots. The tamper platen 42 with engageable arms 54, 56 thereon may then be moved to a new location in another section of the receptacle 12 that is beyond the vertical posts 24. The engageable arms 54, 56 may then be reconnected to the hydraulic cylinders or pistons 70, 72 or the first and second trolley fixtures 80, 82 to begin a next compression at the new location.

A properly compacted mushroom compost bed using the mushroom compacting system according to the invention can shorten the mushroom grow time cycle by one or two days. The system not only expedites mushroom bed preparation with Phase II or Phase III compost, but also produces a more consistent compost compaction that can lead to enhanced yield in a shorter grow time cycle.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A mushroom compost compacting system, comprising:
    a tamper platen with a top surface and a tamping surface opposite the top surface;
    a first engageable arm engaged to the top surface;
    a second engageable arm engaged to the top surface;
    a brace bar with a first end and a second end, wherein said bar is adapted for positioning under and in contact with an external surface of a bottom floor of a compost receptacle at a first location and for re-positioning under and in contact with the external surface of the bottom floor of the compost receptacle at a second location spaced apart from the first location;
    a first hydraulic piston removably coupled directly or indirectly at one end to the first engageable arm and at its opposite end to the first end of the brace bar; and
    a second hydraulic piston removably coupled directly or indirectly at one end to the second engageable arm and at its opposite end to the second end of the brace bar.

2. The mushroom compost compacting system of claim 1, wherein the first hydraulic piston is installed in or joined to a first trolley fixture and the second hydraulic piston is installed in or joined to a second trolley fixture.

3. The mushroom compost compacting system of claim 2, further comprising a first guide rail removably appended to a sidewall of the compost receptacle, and to which the first trolley fixture is coupled for relative movement thereon.

4. The mushroom compost compacting system of claim 3, further comprising a second guide rail removably appended to a second sidewall of the compost receptacle, and to which the second trolley fixture is coupled for relative movement thereon.

5. The mushroom compost compacting system of claim 1, further comprising a guide affixed to or integrally formed with the top surface of the tamper platen, said guide defining a first slot, wherein the first engageable arm is operatively coupled to said first slot for relative movement of the first engageable arm with respect to the top surface of the tamper platen.

6. The mushroom compost compacting system of claim 5, wherein the guide defines a second slot, wherein the second engageable arm is operatively coupled to said second slot for relative movement of the second engageable arm with respect to the top surface of the tamper platen.

7. The mushroom compost compacting system of claim 1, further comprising a first handle affixed to or formed at the one end of the first engageable arm.

8. The mushroom compost compacting system of claim 7, further comprising a second handle affixed to or formed at the one end of the second engageable arm.

9. The mushroom compost compacting system of claim 1, further comprising one or more fasteners to couple the first hydraulic piston to the first engageable arm.

10. The mushroom compost compacting system of claim 1, further comprising one or more fasteners to couple the second hydraulic piston to the second engageable arm.

11. The mushroom compost compacting system of claim 1, further comprising one or more fasteners to couple the first hydraulic piston to the brace bar.

12. The mushroom compost compacting system of claim 1, further comprising one or more fasteners to couple the second hydraulic piston to the brace bar.

13. The mushroom compost compacting system of claim 1, further comprising a first mating pin extending from the guide and at least one latch or hook disposed on the first engageable arm that is adapted to engage said first mating pin.

14. The mushroom compost compacting system of claim 13, further comprising a second mating pin extending from the guide and at least one other latch or hook disposed on the second engageable arm that is adapted to engage the second mating pin.

15. The mushroom compost compacting system of claim 5, wherein the first engageable arm has a first side spaced apart from a second side leaving a gap therebetween, and said first side and said second side are joined together at one end by a shaft or pin that is held within the first slot defined by said guide.

16. The mushroom compost compacting system of claim 15, wherein the second engageable arm has a first side spaced apart from a second side leaving a gap therebetween, and said first side and said second side are joined together at one end by a shaft or pin that is held within the second slot defined by the guide.

17. The mushroom compost compacting system of claim 15, wherein the first engageable arm traverses from a first position seated over the top surface of the tamper platen to a second position with its one end extending outwardly from the top surface of the tamper platen, for connection to the first hydraulic piston.

18. The mushroom compost compacting system of claim 17, wherein the second engageable arm traverses from a first position seated over the top surface of the tamper platen to a second position with its one end extending outwardly from the top surface of the tamper platen and in an opposite direction from the first engageable arm, for connection to the second hydraulic piston.

\* \* \* \* \*